No. 788,939. PATENTED MAY 2, 1905.
H. L. NOXON.
STUFFING BOX.
APPLICATION FILED SEPT. 9, 1904.
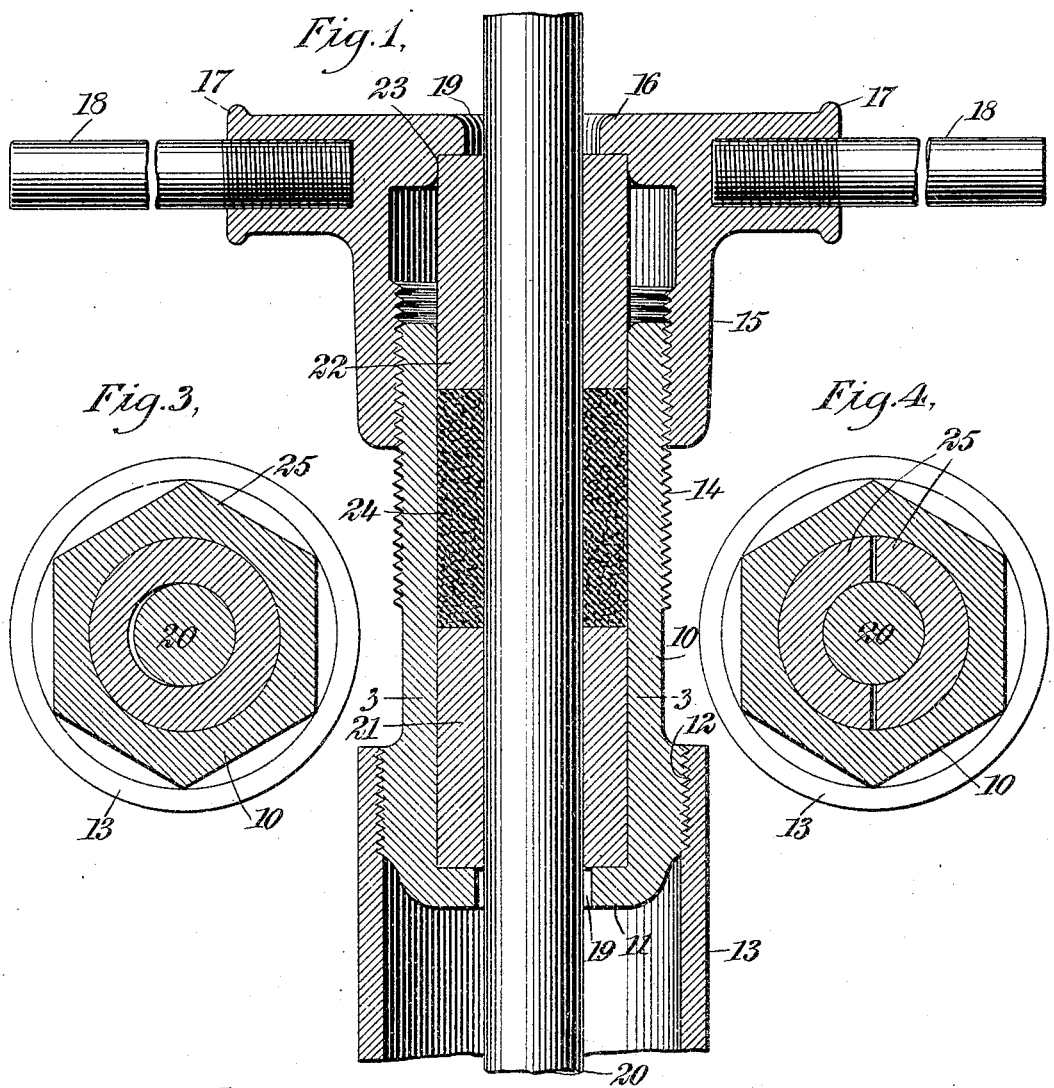
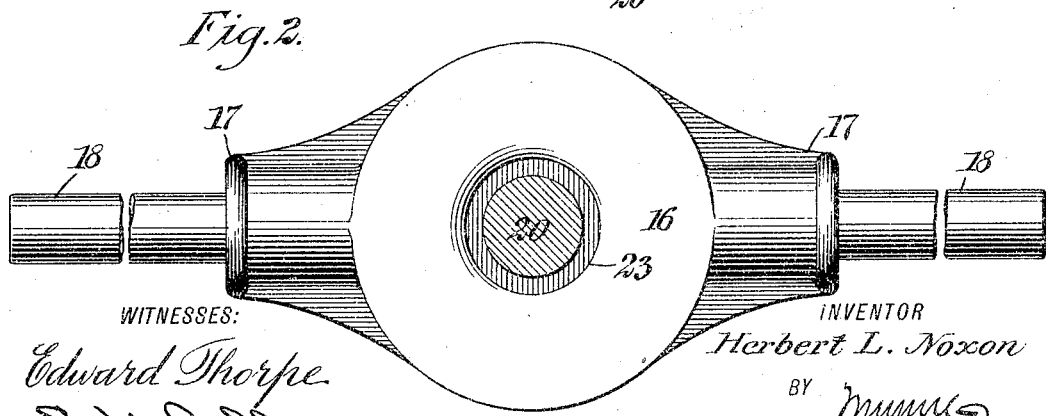
WITNESSES:
Edward Thorpe
S. H. Cobb.
INVENTOR
Herbert L. Noxon
BY Munn
ATTORNEYS No. 788,939. Patented May 2, 1905.

UNITED STATES PATENT OFFICE.

HERBERT L. NOXON, OF BAKERSFIELD, CALIFORNIA.

STUFFING-BOX.

SPECIFICATION forming part of Letters Patent No. 788,939, dated May 2, 1905.

Application filed September 9, 1904. Serial No. 223,884.

*To all whom it may concern:*

Be it known that I, HERBERT L. NOXON, a citizen of the Dominion of Canada, and a resident of Bakersfield, in the county of Kern and State of California, have invented a new and Improved Stuffing-Box, of which the following is a full, clear, and exact description.

My invention relates to stuffing-boxes, and is particularly adapted for use in connection with oil-wells in certain districts in which much sand is ejected with the oil. In these wells it is customary to use a flexible pump-rod, which bends as it operates through the stuffing-box, bringing a pressure upon the latter. This, with the abrasive action of the sand, produces an extremely-destructive effect upon the boxes and, as they are customarily of some such hard metal as iron, upon the rods as well, rendering it necessary to often discard both and put in entirely new ones. To obviate these difficulties is the principal object of my invention.

Reference is to be had to the accompanying drawings, forming a part of this specification, in which similar characters of reference indicate corresponding parts in all the figures.

Figure 1 is a central vertical section through one embodiment of my invention. Fig. 2 is a top plan view thereof, taken in a plane just above the end of the stuffing-box. Fig. 3 is a horizontal section on the line 3 3 of Fig. 1, showing the effect of the lateral strain on the pump-rod; and Fig. 4 is a similar view illustrating a divided bushing.

10 designates a sleeve furnishing the body or chamber of the stuffing-box, which has at its lower end a head 11, adjacent to which, upon the outside of the sleeve, is a thread 12, adapted to be engaged by the pipe 13 of, for example, an oil-well. Upon the opposite or upper end of the sleeve is a second external thread 14, with which coacts a cover or gland 15, having a head 16. From each side of this gland preferably project sockets 17, which may be threaded to receive operating-bars 18, by which the gland may be turned to tighten the packing within the box.

In the heads of the sleeve and gland are alined openings 19 19, through which may pass a pump or other rod 20, the openings and rod being of such diameter that a considerable space is left between their walls so there will be no contact over these surfaces during the reciprocation of the rod. Fitting within the sleeve and also about the rod are opposite bushings 21 and 22, which are formed of some such soft and easily-fusible metal as babbitt or brass, which may be conveniently melted by the user of the stuffing-box to permit their being formed by him for renewal. The bushing 21 rests upon the head 11, while its companion extends into a recess 23 in the inner side of the gland-head, the faces with which the ends of these bushings contact being substantially parallel, thus securing a direct thrust toward one another. Between the adjacent ends of the bushings is a space to permit the introduction of suitable packing material 24. Instead of continuous bushings, as is illustrated in Fig. 3, they may be split or divided longitudinally, as shown at 25 in Fig. 4, and operate in the same manner.

In use the bushing 22 is turned down upon the packing, forcing this against the bushing 21 by rotating the gland by means of its projecting rods. Thus the upper bushing acts as a portion of the gland, communicating its pressure to the packing to expand it against the rod and sleeve. No lateral thrust is communicated by the rod to the sleeve-head or gland-head, and thus they are not subjected to wear, this instead falling upon the bushings, Fig. 3, which may be readily formed by the user of the stuffing-box and replaced. Moreover, these wearing-surfaces of the box being of soft metal there is comparatively little cutting effect upon the rod, and therefore it wears for a much longer period.

Having thus described my invention, I claim as new and desire to secure by Letters Patent—

1. A stuffing-box comprising a sleeve having a head, a gland threaded upon the opposite end of the sleeve from the head, and bushings of comparatively soft metal fitting within the sleeve and contacting with the head and gland, there being a space left between the bushings for the introduction of packing.

2. A stuffing-box comprising a sleeve having a head, a gland threaded upon the opposite end of the sleeve from the head, operating-rods projecting from the gland, and bushings of comparatively soft metal fitting within the sleeve and contacting with the head and gland, there being a space left between the bushings for the introduction of packing.

3. A stuffing-box comprising a sleeve having a head, a gland threaded upon the opposite end of the sleeve from the head, and bushings of comparatively soft metal fitting within the sleeve and contacting with the head and gland over substantially parallel faces, there being a space left between the bushings for the introduction of packing.

4. The combination with a sleeve having a head and a gland operating upon the end of the sleeve, said head and gland being provided with alined openings, of a rod extending through the openings out of contact with their walls, and bushings coacting with the sleeve-head and gland and fitting both the rod and sleeve, there being a space left between the bushings for the introduction of packing.

5. The combination with a sleeve having a head and threads adjacent to said head and upon the opposite end of the sleeve, of a pipe engaging the thread adjacent to the head, a gland coacting with the opposite thread, both head and gland being provided with openings, a rod extending through the openings, bushings surrounding the rod at opposite ends of the sleeve, and packing interposed between the bushings.

In testimony whereof I have signed my name to this specification in the presence of two subscribing witnesses.

HERBERT L. NOXON.

Witnesses:
GEO. R. GRUBB,
T. W. MAYHEW.